United States Patent
Buch (10) Patent No.: US 8,366,343 B2
(45) Date of Patent: Feb. 5, 2013

(54) APPARATUS FOR FLUID STORAGE USING PAVER BLOCKS

(75) Inventor: Douglas J. Buch, Greenfield, WI (US)

(73) Assignee: ECS Solutions, LLC, Greenfield, WI (US)

( * ) Notice: Subject to any disclaimer, the term of this patent is extended or adjusted under 35 U.S.C. 154(b) by 0 days.

(21) Appl. No.: 13/163,232

(22) Filed: Jun. 17, 2011

(65) Prior Publication Data

US 2011/0250013 A1    Oct. 13, 2011

Related U.S. Application Data (62) Division of application No. 12/014,325, filed on Jan. 15, 2008, now Pat. No. 8,251,607.

(51) Int. Cl.
*E01C 5/00* (2006.01)

(52) U.S. Cl. .................. 404/41; 404/34; 52/606

(58) Field of Classification Search .......... 52/596, 52/606, 607; 404/34, 39, 41; 405/16, 20; D25/113, 114
See application file for complete search history.

(56) References Cited

U.S. PATENT DOCUMENTS

| | | | |
|---|---|---|---|
| 19,592 A | 3/1858 | Tewkesbury | |
| 61,580 A | 1/1867 | Tarr | |
| 378,825 A | 2/1888 | Brannigan | |
| 379,926 A | 3/1888 | Anderson | |
| 572,762 A | 12/1896 | Landers | |
| 815,641 A | 3/1906 | Schoeneman | |
| 836,017 A | 11/1906 | Douglass | |
| 1,277,829 A | 9/1918 | Baum | |
| 1,305,294 A | 6/1919 | McIntyre | |
| 4,227,829 A | 10/1980 | Landry, Jr. | |
| 4,246,305 A | 1/1981 | Delattre | |
| 4,370,075 A | 1/1983 | Scales | |
| 4,375,928 A | 3/1983 | Crow et al. | |
| 4,564,311 A | 1/1986 | Scales | |
| 4,571,353 A | 2/1986 | Gable, Jr. | |
| 4,572,699 A * | 2/1986 | Rinninger | 404/42 |
| 4,719,738 A | 1/1988 | Lee | |
| 4,792,257 A * | 12/1988 | Rinninger | 404/41 |
| 5,159,801 A | 11/1992 | Schmidt | |
| 5,281,048 A | 1/1994 | Hagenah | |
| 5,484,230 A | 1/1996 | Rudloff | |
| 5,499,888 A | 3/1996 | Hawkes | |
| 5,533,827 A * | 7/1996 | Scheiwiller | 404/38 |

(Continued)

FOREIGN PATENT DOCUMENTS

| | | | |
|---|---|---|---|
| DE | 10244929 A1 | 4/2003 | |
| GB | 2134561 A | 8/1984 | |

(Continued)

OTHER PUBLICATIONS

ECO CRETO Frequently Asked Questions, http://www.ecocreto.com/faq.html, Jul. 10, 2007.

(Continued)

*Primary Examiner* — Gary S Hartmann
(74) *Attorney, Agent, or Firm* — Boyle Fredrickson, S.C.

(57) ABSTRACT

Systems and methods for a porous pavement system are described. The porous pavement system includes paver blocks designed to facilitate water seepage between the paver blocks and to permit water storage within the blocks. The paver blocks may be cabled together to create paving units that facilitate installation and maintenance of the pavement system. The porous pavement system provides improved management of stormwater, reducing runoff and facilitating infiltration of stormwater into the subgrade below the paving system.

20 Claims, 5 Drawing Sheets

U.S. PATENT DOCUMENTS

| | | |
|---|---|---|
| 5,779,391 A | 7/1998 | Knight |
| 5,797,698 A | 8/1998 | Barth et al. |
| D399,577 S | 10/1998 | Scales |
| 5,906,456 A | 5/1999 | Knight |
| 5,921,710 A | 7/1999 | Scales |
| 6,071,041 A | 6/2000 | Knight |
| 6,164,026 A | 12/2000 | Ehrenkrantz |
| 6,416,253 B1 | 7/2002 | Wimp et al. |
| 6,508,607 B1 | 1/2003 | Smith et al. |
| 6,536,988 B2 * | 3/2003 | Geiger ............................ 404/39 |
| 6,579,038 B1 | 6/2003 | McAllister et al. |
| D482,801 S | 11/2003 | Dice et al. |
| 6,682,269 B2 | 1/2004 | Price et al. |
| D504,957 S | 5/2005 | Dice et al. |
| 6,939,077 B1 | 9/2005 | Hart |
| D516,735 S | 3/2006 | Kees et al. |
| D575,414 S | 8/2008 | Salerno |
| 7,594,365 B2 | 9/2009 | Kang et al. |
| D609,369 S * | 2/2010 | Buch ............................ D25/113 |
| 7,717,644 B2 | 5/2010 | Han |
| 8,251,607 B2 * | 8/2012 | Buch ............................ 404/41 |
| 2002/0124509 A1 | 9/2002 | Smyer, III |
| 2005/0055983 A1 | 3/2005 | Tomes |
| 2005/0252145 A1 | 11/2005 | MacDonald et al. |
| 2007/0269265 A1 | 11/2007 | Thorkelson |
| 2011/0250013 A1 | 10/2011 | Buch |

FOREIGN PATENT DOCUMENTS

| | | |
|---|---|---|
| JP | 7197429 A | 8/1995 |

OTHER PUBLICATIONS

Photographs from ECO CRETO Office and parking lot, Jul. 2, 2007.
Advanced Pavement Technology, Eco-Brick and Aqua-Loc Brochure.
SF-RIMA Permeable Concrete Paving Stone System Brochure.
Uni-Group U.S.A., Uni Eco-Stone website http:///www.uni-groupusa.org/uni-eco-.htm, Sep. 12, 2006.
PaveDrain, LLC, Competitive Analysis document, Jul. 2007, pp. 13-14 Discusses EGRA Stone by Paveloc Industries.
Armortec, Armorflex Standard Detail (Class 70 Dimensions), CAD drawings available online: http://www.contech-cpi.com/media/assets/asset/file_name/5408/Class_70_Dimensions.pdf.
PCT/US2009/031079; International Filing Date Jan. 15, 2009, Notification Concerning Transmittal of International Preliminary Report on Patentability; International Preliminary Report on Patentability; Written Opinion of the International Searching Authority.

* cited by examiner

APPARATUS FOR FLUID STORAGE USING PAVER BLOCKS

CROSS-REFERENCE TO RELATED APPLICATIONS

This application is a divisional application of U.S. patent application Ser. No. 12/014,325, filed Jan. 15, 2008, now U.S. Pat. No. 8,251,607, the entire contents of which is incorporated herein by reference.

BACKGROUND OF THE INVENTION

1. Field of the Invention

The present invention relates in general to the field of paving systems. More particularly, the present invention relates to paver blocks. Specifically, a preferred embodiment of the present invention relates to paver blocks which may be installed individually or as paving units and which provide fluid storage within the paver blocks.

2. Discussion of the Related Art

As is known to those skilled in the art, paving systems historically create a surface impervious to rain. The water that falls on the paved surface runs off the edge of the paving surface rather than being absorbed into the ground beneath the paved surface. It is recognized that an increasing number of paved surfaces and the subsequent stormwater runoff from these paved surfaces contributes to lowered water tables and rising stream levels. Thus, it is a previously recognized problem with paving systems that stormwater runoff needs to be managed.

Historically, it was known in the prior art to manage stormwater using a curb and gutter system to guide the stormwater into sewer systems. More recently the stormwater has been guided into detention basins to allow the water to be absorbed closer to the paved surface. Needless to say, it is desirable to provide a porous pavement system allowing the stormwater to drain through the paving system and to be absorbed into the ground under the paving system, minimizing the need for any additional stormwater management system.

However, such a porous pavement system has not been fully met without incurring various disadvantages. For example, U.S. Pat. No. 5,797,698 and U.S. Pat. No. 6,939,077 disclose paving elements designed to allow water to drain between adjacent paving blocks. While these paver blocks, as disclosed, allow stormwater to drain down the sides of the block, they are still susceptible to one of the major drawbacks of existing porous pavement systems: they are totally dependent on the aggregate subgrade and the underlying soil for infiltration. Sandy or rocky soils have more cracks and fissures that allow the water to filter into and away from the surface, but heavy, clay soils do not drain quickly and require a longer retention time prior to the water entering the soil.

Another unsatisfactory, previously recognized approach to solving the problem of being dependent on the subgrade and soil for infiltration involves the use of underground storage systems. These storage systems are made of plastic and have several feet of aggregate dumped on top of them. A disadvantage of this approach is the inability to clean out the underground storage systems once they are filled with sedimentation and particulates from stormwater runoff. Therefore, a preferred solution will manage the stormwater runoff to improve infiltration of the water into any type of soil and, if it becomes necessary, will allow for sedimentation to be cleaned out from the water storage system.

SUMMARY AND OBJECTS OF THE INVENTION

Consistent with the foregoing and in accordance with the invention as embodied and broadly described herein, a paver block and a porous pavement system are disclosed in suitable detail to enable one of ordinary skill in the art to make and use the invention.

In one embodiment of the invention, a paver block includes an upper surface and a lower surface opposite the upper surface. The upper and lower surfaces are connected by a plurality of sides. At least one of the sides includes a drainage spacer that extends along at least a portion of the side. At least one of the lower surface and the plurality of sides has a cavity at least partially enclosed by the paver block. The cavity allows fluid to be stored within the paver block, and the volume of the cavity is at least two percent of the volume of the paver block.

In another embodiment of the invention, the cavity extends along the lower surface of the paver block. The width of the cavity is between 25 and 50 percent of the width of the lower surface, and the height of the cavity is between 25 and 50 percent of the height of one of the sides of the paver block.

In still another embodiment, the cavity extends along one of the sides of the paver block. The height of the cavity is between 25 and 50 percent of the height of one of the sides, and the width of the cavity is between 20 and 50 percent of the width of the upper surface of the paver block.

In another embodiment, the upper surface joins the plurality of sides at a rounded edge, and the angle, alpha, between at least one of the sides and a vertical plane is less than about three degrees. In yet another embodiment, the cavity of the paver block is arched, and in still another embodiment, the cavity of the paver block has sufficient volume to store at least an inch of rain that falls on the upper surface of the block.

In one embodiment, the paver block includes an upper surface and a lower surface opposite the upper surface. The upper and lower surfaces are connected by a plurality of sides. At least one of the sides includes a drainage spacer that extends along at least a portion of the side. A first side of the paver block contains at least one aperture and a second, opposing side contains at least one aperture. Each of the apertures on the first side has a corresponding aperture on the second side and a fluid passage is defined between each of the corresponding apertures. The volume of the at least one fluid passage is at least two percent of the volume of the paver block and allows fluid storage within the paver block.

In still another embodiment of the invention, a porous pavement system includes a plurality of paver blocks. Each of the plurality of blocks may be, but is not limited to, one of the embodiments of paver blocks described above. A cable runs through a plurality of ducts. Each duct is contained within one of the plurality of blocks. The cable-connected blocks may then be installed as a single paving unit.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

In describing the preferred embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word "connected", "attached", or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

In basic form, the invention is a porous paving system made up of paver blocks. These blocks may be installed individually or, alternately, cabling may be passed through ducts in the blocks and multiple paver blocks may be installed in a single unit. The paver blocks are designed to facilitate water drainage down the sides of the block. In addition, the paver blocks include a cavity allowing for the storage of fluid within the paver block. This results in a porous paving system that provides for stormwater storage within the paving system unlike conventional paving systems.

2. Detailed Description of Preferred Embodiments

Specific embodiments of the present invention will now be further described by the following, non-limiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

Figure 1:
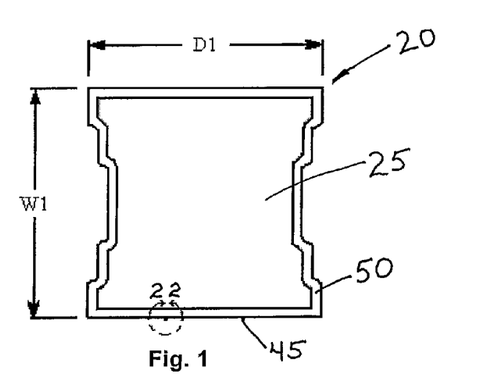
FIG. 1 is a top view of a first embodiment of a paver block.
Figure 2:
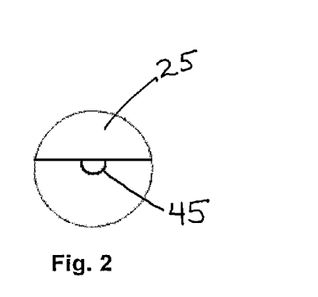
FIG. 2 is a sectional view taken along 2-2 of FIG. 1.
Figure 3:
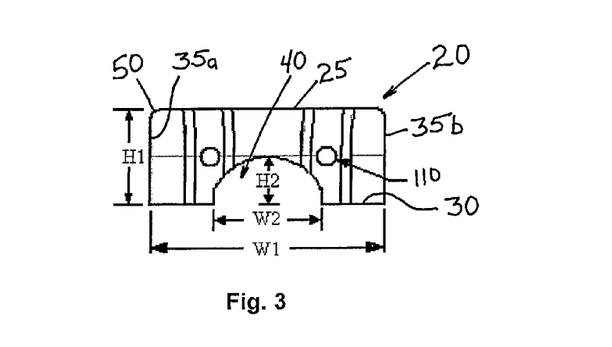
FIG. 3 is an end view of a first embodiment of a paver block.
Figure 4:
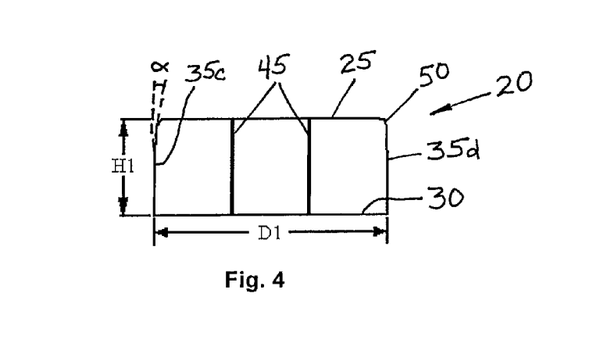
FIG. 4 is a side view of a first embodiment of a paver block.

Turning initially to FIGS. 1-4, a preferred embodiment of a paver block 20 used in a porous paving system 100 is depicted. The paver block 20 is generally comprised of an upper surface 25, a lower surface 30, a plurality of sides 35, and a cavity 40. It is contemplated that the paver block 20 could be of any shape known to one of ordinary skill in the art, including, but not limited to, a square, a rectangle, and a hexagon. A preferred embodiment is illustrated in FIG. 1 where the paver block 20 has two flat sides 35a, b and two stepped sides 35c, d. Additionally, the paver block 20, may be manufactured in a variety of heights, H1, widths, W1, and depths, D1, with a preferred minimum block size being at least 12 inches wide, 12 inches deep, and 5 inches high. The paver block may be manufactured out of any material known to one of ordinary skill in the art, but is preferably a concrete block. At least one drainage spacer 45 extends at least partially along one of the sides 35a-d of the paver block 20. In the preferred embodiment, two drainage spacers 45 extend vertically along the entire height, H1, of one of the sides 35a-d of the paver block 20. In addition, at least one, and preferably all, of edges 50 between the upper surface 25 and each of the sides 35a-d will be rounded, creating seepage down the sides of the block.

Figure 5:
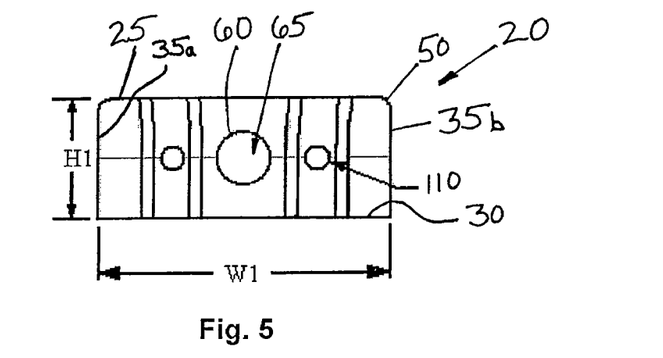
FIG. 5 is an end view of a second embodiment of a paver block.

A cavity 40 allows fluid storage within the paver block 20, and is especially designed to contain stormwater that has drained down the sides of the paver block 20. The cavity 40 may be partially or wholly defined by the paver block 20. The cavity 40 may be designed in a wide variety of shapes and sizes to allow for fluid storage within the paver block 20. In a preferred embodiment of the cavity 40, illustrated in FIG. 3, the cavity 40 is an arch extending along the entire bottom surface 30. Another embodiment of the cavity 40 is shown in FIG. 5 wherein the cavity 40 is a fluid passage 65 extending entirely through the paver block 20. A further embodiment of the cavity 40, not illustrated, may include multiple fluid passages 65 extending through the paver block 20. Still another embodiment of the cavity 40, not illustrated, may be an arch extending along the side 35a-d of the paver block. The aforementioned examples disclose several embodiments for the cavity 40, but the structure of the cavity 40 could be any shape or size capable of storing fluid within the block such as, but not limited to, a square or rectangular cavity extending across the bottom, side or through the paver block 20.

The paver block 20 is designed to balance fluid storage and structural integrity. Preferably, the volume of the cavity 40 allows for at least the first inch of stormwater that falls on the top surface 25 of the paver block 20 to be stored within the cavity 40 of the paver block 20. This stored water subsequently filters out of the cavity 40 into the aggregate subgrade 135 and soil below the paving system 100.

The paver blocks 20 may be installed individually to create a porous paved surface. Alternately, multiple blocks may be installed as a single paving unit 115 to increase speed and efficiency of installation of the porous pavement system 100. To permit installation as a single paving unit 115, each paver block 20 includes holes or ducts 110 passing through the paver block 20. Each duct 110 is sized to allow a cable 105 to pass therethrough, and is preferably one inch in diameter. In addition, the sides 35a-d of the blocks through which the ducts 110 pass will have some angle, alpha, between the side 35a-d and a vertical plane. It is desirable to minimize this angle as much as possible, but the angle allows some flexibility between blocks in a paving unit 115. It is desirable to keep this angle, alpha, less than 3 degrees and preferably between 1 and 2 degrees.

Figure 6:
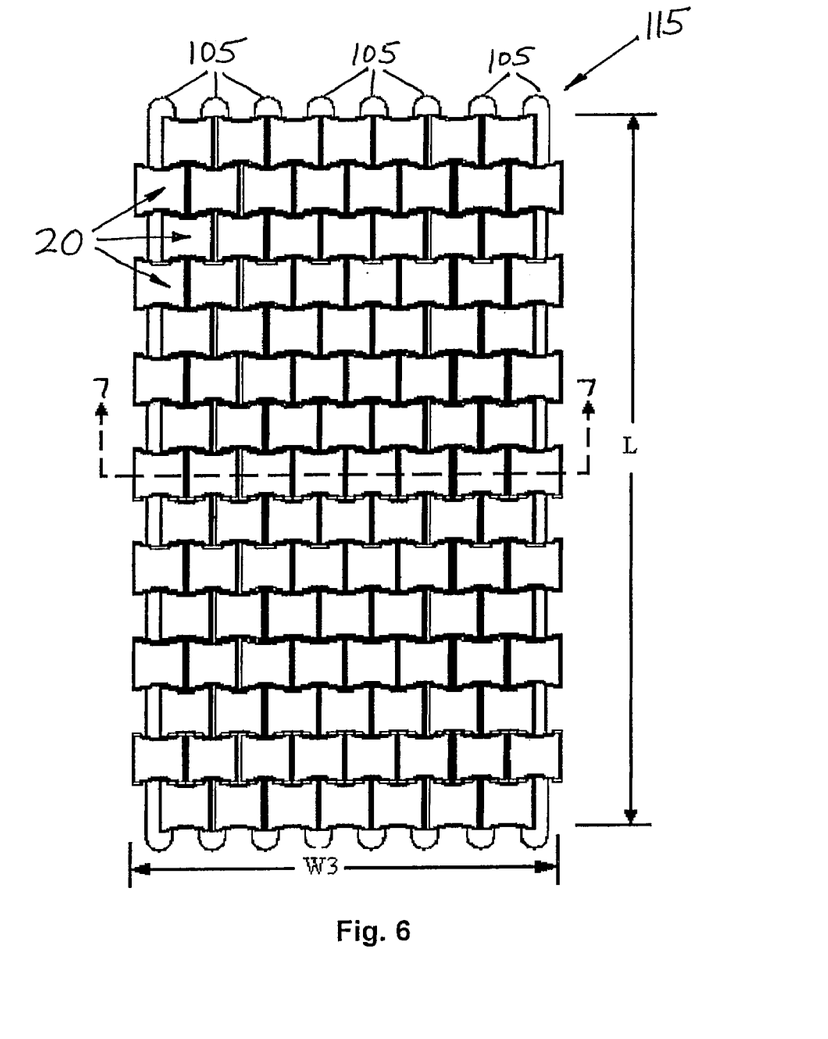
FIG. 6 is a top view of a first embodiment of a paving unit.
Figure 7:
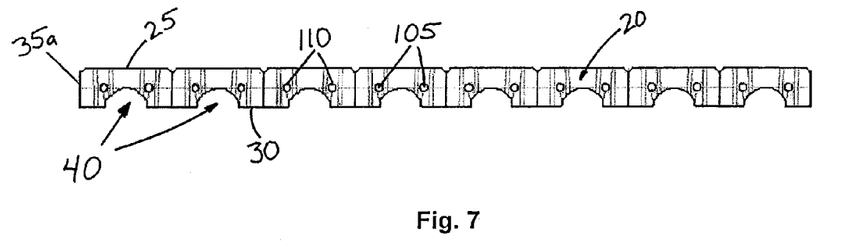
FIG. 7 is a sectional view taken along 7-7 of FIG. 6.

Referencing FIG. 6, the paving unit 115 is constructed by passing at least one cable 105 through multiple paver blocks 20. It is contemplated that the paving unit 115 will be of varying widths, W3, and lengths, L, to accommodate the desired application, including, but not limited to, pathways, driveways, parking lots, and roads. Preferably the paving unit 115 is about 8 feet wide and may extend from 8 to 60 feet in length. Based on its application, the paver block may accommodate either pedestrian or vehicular traffic. The paver block 20 is preferably designed to accommodate a load of up to 4000 pounds per square inch.

Figure 8:
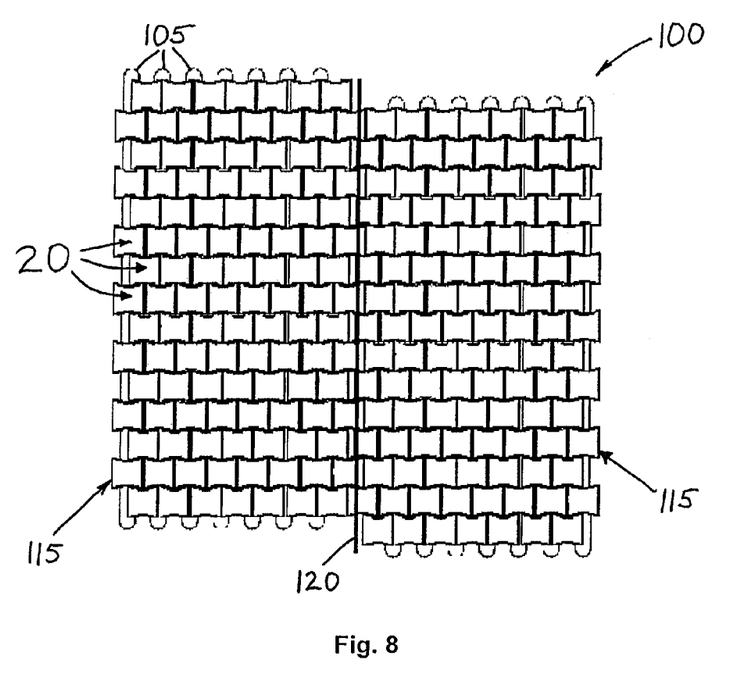
FIG. 8 is a top view of a first embodiment of a porous paving system.
Figure 9:
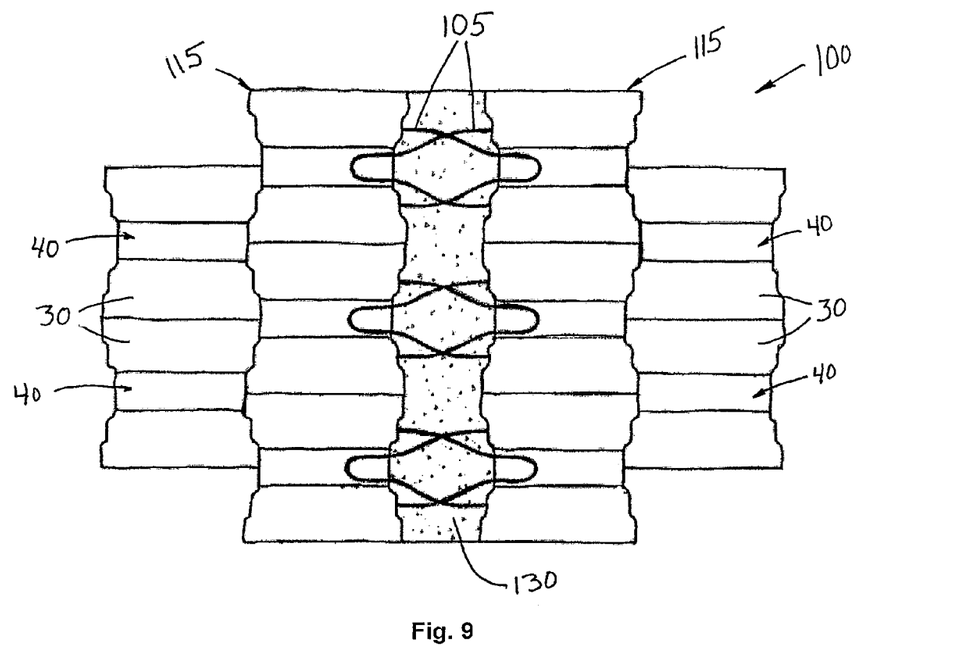
FIG. 9 is a bottom view of a grout joint connecting two paving units.
Figure 10:
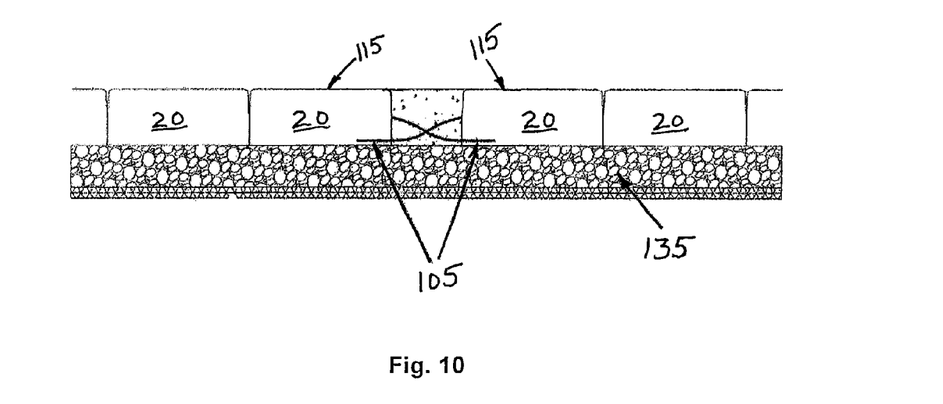
FIG. 10 is a sectional view taken along 10-10 of FIG. 9.

Referencing FIGS. 8 and 9, multiple paving units may be installed either adjacent to each other or in an end-to-end configuration. When two paving units 115 are installed adjacent to each other, the paver blocks 20 along the side of a paving unit 115 are staggered such that the side blocks of the first paving unit 115 interweave with the side blocks of the second paving unit 115, creating a continuous paved surface. In addition, the ducts 110 of the paver blocks 20 in the first paving unit 115 align with the ducts 110 of the paver blocks 20 in the second paving unit 115, allowing an interlocking cable 120 to pass therethrough, securing the first paving unit 115 to the second paving unit 115.

When the blocks of two paving units 115 are installed in an end-to-end configuration, a preferred joining method is depicted in FIG. 9. The cables 105 of the first paving unit 115 are tucked into the cavities 40 of the paver blocks 20 at the end of the second paving unit 115. Likewise, the cables 105 of the second paving unit 115 are tucked into the cavities 40 of the paver blocks 20 at the end of the first paving unit 115. A sheath 125 is laid into the gap between the two paving units 115, desirably using a very narrow veneer plastic sheath. Preferably, the plastic sheath 125 is only ten to twelve inches wide and eight to ten mils thick. This sheath prevents grout from entering the cavities 40 of the paver blocks 20 at the end of either paving unit 115 and additionally isolates the cables 105 from the grout. Finally, grout is poured between the two paving units 115 to form a joint 130. The grout may be of any type known to one of skill in the art and suitable for the application, but is preferably a pervious concrete or small aggregate grout.

Figure 11:
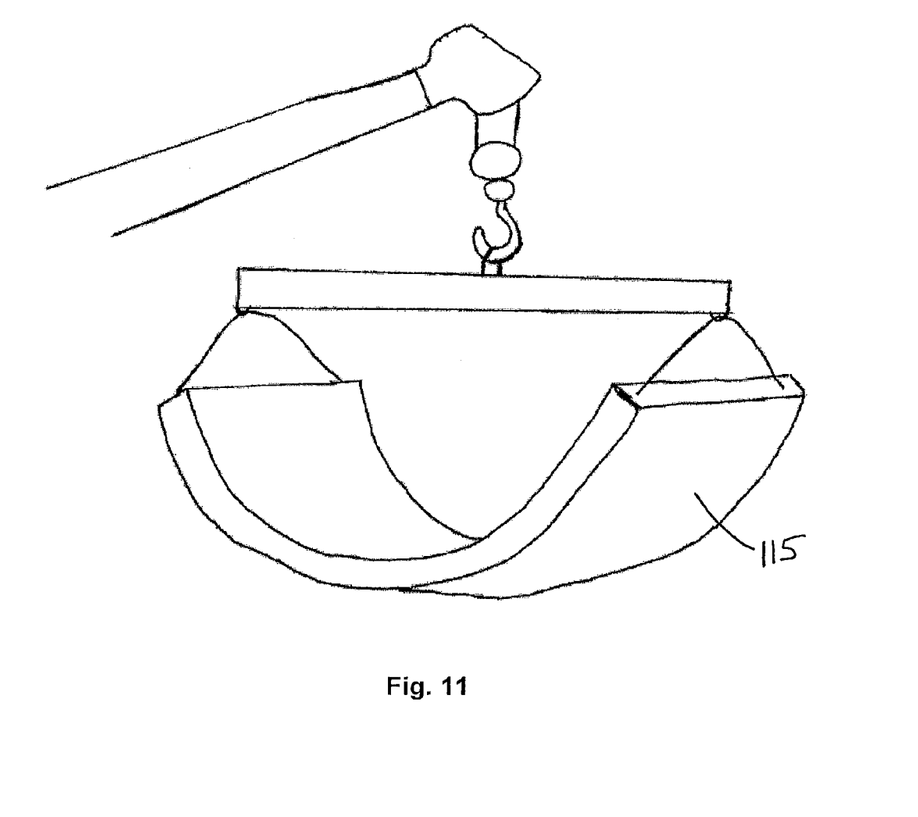
FIG. 11 is an exemplary embodiment of lifting a paving unit.

Each paving unit is preferably installed as a single unit. Referring to FIG. 11, an exemplary paving unit 115 is being lifted using a crane, but installation may be performed by any means known to one skilled in the art, such as a forklift. Further, if cleaning of the cavities 40 of the paver blocks 20 becomes necessary, the paving unit 115 may be subsequently lifted out, the cavities 40 and subgrade 135 cleaned of debris, and the paving unit 115 reinstalled.

In another embodiment, each duct is about 2.75 inches from the bottom of each block. Each paving unit may extend from about 8 feet to about 60 feet in length. In a further embodiment, the cavities in each of the plurality of blocks has sufficient volume to store at least one inch of rain from the upper surface of the plurality of blocks in the paving unit. The stored rain water then filters into the subgrade under the paving unit.

In yet another embodiment of the invention, the cable may be, but is not limited to, one of the following materials: polyester, stainless steel, and galvanized steel. The paving unit, after having been installed, may subsequently be lifted as a single unit to allow cleaning of the cavities of each of the paving blocks if necessary. The paving unit may further be reinstalled as one unit once cleaning of the cavities is complete. In still another embodiment, the cavities of each of the paving blocks may be cleaned while the paving unit remains installed.

In another embodiment, a first paving unit may be installed adjacent to a second paving unit. The blocks along the edges of the first paving unit and the second paving unit interweave. In yet another embodiment, a cable may alternately pass through a duct of the first paving unit and a duct of the second paving unit to interlock the first and the second paving units.

In a final embodiment, two paving units may be installed such that an end of the first paving unit is positioned next to the end of the second paving unit. A sheath may be used, preferably an 8 to 10 mil thickness plastic, to line the area between the two paving units and prevent grout from entering the cavities on the plurality of blocks. A grout joint may seal the area between the two paving units. The grout joint may consist of, but is not limited to, pervious concrete or small aggregate.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

Moreover, the individual components need not be formed in the disclosed shapes, or assembled in the disclosed configuration, but could be provided in virtually any shape, so as to provide a paver block with a cavity capable of storing fluid. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

What is claimed is:

1. A block for use in a paving system, comprising:
   an upper surface;
   a lower surface generally parallel to and spaced apart from the upper surface;
   a first, second, third, and fourth side, each side having a height and connecting the upper and the lower surface, wherein a first side is non-planar and a second side, opposite the first side, is non-planar and complementary to the first side such that the first side of the block engages the second side of a second block placed adjacent to the block to restrict lateral movement of the adjacent blocks;
   a generally rounded upper edge at the connection of each side to the upper surface;
   a pair of ducts extending through the block between the first side and the second side, wherein at least a portion of each of the first side and the second side slopes toward the rounded upper edge;
   at least one spacer protruding from at least one of the plurality of sides and extending along at least a portion of the height of the side; and
   a cavity extending along the length of the lower surface, wherein the cavity allows fluid storage within the block and the volume of the cavity is at least two percent of the volume of the block; and wherein each of the first and second sides includes:
   a first, central surface,
   a second surface stepped toward an outer periphery of the block from the first surface,
   a third surface stepped an equal distance toward the outer periphery along an opposite edge of the first surface,
   a fourth surface stepped to the outer periphery from the second surface, and a fifth surface stepped to the outer periphery from the third surface.

2. The block of claim 1 wherein the slope of the first and second sides is defined by an angle formed between each of the sides and a plane extending perpendicular from the lower surface, wherein the angle formed is between about 1 degree and about 3 degrees.

3. The block of claim 1 further comprising:
a first spacer protruding from and extending along at least one of the third side and the fourth side; and
a second spacer protruding from and extending along at least one of the third side and the fourth side.

4. The block of claim 1 wherein a width of the cavity is at least 25 percent of a width of the lower surface, and a height of the cavity is between 25 and 50 percent of a height of one of the sides.

5. The block of claim 1 wherein:
a plurality of blocks aligned in a plurality of rows form a paving unit such that the first side of the blocks in a first row interlock with the second side of blocks in an adjacent row, creating a paved surface, and
a first of the pair of ducts of the paver blocks in the first row align with a second of the pair of ducts of the paver blocks in the second row, allowing an interlocking cable to pass therethrough, securing the first row to the second row.

6. A block for use in a paving system, further comprising:
a continuous upper surface;
a lower surface generally opposite the upper surface having a cavity extending along the lower surface;
a non-planar first side further comprising:
a lower portion defining an arch in communication with the cavity, the lower portion extending generally orthogonal from the lower surface for a first portion of the height of the first side, and
an upper portion extending obliquely inward from an upper edge of the lower portion to the upper surface, wherein the first side is symmetrical about a center line extending from the lower surface to the upper surface and each half of the first side includes at least a first section extending between the lower surface and the upper surface and a second section extending between the lower surface and the upper surface, the second section displaced from the first section;
a non-planar second side generally opposite the first side, further comprising:
a lower portion defining an arch in communication with the cavity, the lower portion extending generally orthogonal from the lower surface for a first portion of the height of the second side, and
an upper portion extending obliquely inward from an upper edge of the lower portion to the upper surface, wherein the second side is symmetrical about a center line extending from the lower surface to the upper surface and each half of the second side includes at least a first section extending between the lower surface and the upper surface and a second section extending between the lower surface and the upper surface, the second section displaced from the first section;
a third side generally defined by the lower surface, the upper surface, the first side and the second side;
a fourth side generally opposite the third side and defined by the lower surface, the upper surface, the first side and the second side;
a first duct extending between the first side and the second side;
a second duct generally parallel to the first duct extending between the first side and the second side; and
at least one spacer protruding from and extending substantially along the height of at least one of the third side and the fourth side.

7. The block of claim 6, wherein:
each half of the first side further comprises a third section extending between the lower surface and the upper surface, the third section displaced from each of the first and second sections; and
each half of the second side further comprises a third section extending between the lower surface and the upper surface, the third section displaced from each of the first and second sections.

8. The block of claim 6, further comprising:
a first spacer protruding from and extending substantially along the height of at least one of the third side and the fourth side; and
a second spacer protruding from and extending substantially along the height of at least one of the third side and the fourth side.

9. The block of claim 6 wherein each of the first duct and the second duct are positioned within the upper portion of each of the first side and the second side.

10. The block of claim 6, wherein:
an angle defined between a plane extending from the lower portion of the first side and the obliquely extending upper portion of the first side is between about 1 and 3 degrees; and
an angle defined between a plane extending from the lower portion of the second side and the obliquely extending upper portion of the second side is between about 1 and 3 degrees.

11. The block of claim 6 wherein a width of the cavity is at least 25 percent of a width of the lower surface, and a height of the cavity is between 25 and 50 percent of a height of one of the sides.

12. The block of claim 6 wherein the first side of the block is configured to be positioned adjacent to and offset by one half the width of the first side to the second side of a second block and the second side of a third block.

13. The block of claim 12 wherein:
one of the first section and the second section of one half of the first side of the first block engages one of the first section and the second section of one half of the second side of the second block,
one of the first section and the second section of the other half of the first side of the first block engages one of the first section and the second section of one half of the second side of the third block, and
the engagement of the first block with the second and third blocks prevent lateral movement by the first block with respect to the second and third blocks.

14. A block for use in a paving system, further comprising
an upper surface;
a lower surface opposing the upper surface;
a first side extending between the upper and the lower surface including at least one of a recessed or a raised section;
a second side generally opposite the first side extending between the upper and the lower surface including at least one of a raised or a recessed section;
a third side extending between the upper and the lower surface;
a fourth side generally opposite the third side extending between the upper and the lower surface;

at least one drainage spacer extending along at least a portion of one of the third and fourth sides;
a pair of ducts extending between the first side and the second side; and
a channel extending along the lower surface between an outlet on the first side and an outlet on the second side,
wherein the recessed or raised sections on each of the first and second sides define a stepped surface including:
a first, central surface,
a second surface stepped toward an outer periphery of the block from the first surface,
a third surface stepped an equal distance toward the outer periphery along an opposite edge of the first surface,
a fourth surface stepped to the outer periphery from the second surface, and
a fifth surface stepped to the outer periphery from the third surface including:
a first, central surface,
a second surface stepped toward an outer periphery of the block from the first surface,
a third surface stepped an equal distance toward the outer periphery along an opposite edge of the first surface,
a fourth surface stepped to the outer periphery from the second surface, and
a fifth surface stepped to the outer periphery from the third surface.

15. The block of claim 14, further comprising:
a first spacer protruding from and extending substantially along the height of at least one of the third side and the fourth side; and
a second spacer protruding from and extending substantially along the height of at least one of the third side and the fourth side.

16. The block of claim 14, wherein:
the channel is arched;
a width of the channel is less than a width of the lower surface; and
a center line of the channel is aligned with a center line of the lower surface.

17. The block of claim 14 wherein the first side of the block is configured to be positioned adjacent to and offset by one half the width of the first side to the second side of a second block and the second side of a third block.

18. The block of claim 17 wherein:
the channel of the first block is in fluid communication with the channel of each of the second and third blocks; and
the outlet on the first side of the first block is in communication with less than half of the outlets on the second side of each of the second and third blocks.

19. The block of claim 17 wherein:
each of the pair of ducts extends generally parallel to the other of the pair of ducts;
a first duct of the pair of ducts in the first block generally aligns with a second duct of the pair of ducts in the second block; and
the second duct of the pair of ducts in the first block generally aligns with the first duct of the pair of ducts in the third block.

20. The block of claim 14 wherein:
the first side is non-planar and further comprises:
a lower portion defining an arch in communication with the channel, the lower portion extending generally orthogonal from the lower surface for a first portion of the height of the first side, and
an upper portion extending obliquely inward from an upper edge of the lower portion to the upper surface, wherein the first side is symmetrical about a center line extending from the lower surface to the upper surface and each half of the first side includes at least a first section extending between the lower surface and the upper surface and a second section extending between the lower surface and the upper surface, the second section displaced from the first section; and
the second side is non-planar and further comprises:
a lower portion defining an arch in communication with the channel, the lower portion extending generally orthogonal from the lower surface for a first portion of the height of the second side, and
an upper portion extending obliquely inward from an upper edge of the lower portion to the upper surface, wherein the second side is symmetrical about a center line extending from the lower surface to the upper surface and each half of the second side includes at least a first section extending between the lower surface and the upper surface and a second section extending between the lower surface and the upper surface, the second section displaced from the first section.

* * * * *